(12) United States Patent
Vermani et al.

(10) Patent No.: US 9,509,391 B2
(45) Date of Patent: Nov. 29, 2016

(54) SOUNDING FEEDBACK SCHEMES FOR VERY HIGH THROUGHPUT WIRELESS SYSTEMS

(75) Inventors: Sameer Vermani, San Diego, CA (US); Rahul Tandra, San Diego, CA (US); Albert Van Zelst, Woerden (NL); Didier Johannes Richard Van Nee, De Meern (NL); Hemanth Sampath, San Diego, CA (US); Vincent Knowles Jones, IV, Redwood City, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 799 days.

(21) Appl. No.: 13/227,185

(22) Filed: Sep. 7, 2011

(65) Prior Publication Data

US 2012/0058735 A1   Mar. 8, 2012

Related U.S. Application Data

(60) Provisional application No. 61/380,812, filed on Sep. 8, 2010.

(51) Int. Cl.
*H04B 1/00* (2006.01)
*H04B 7/06* (2006.01)
*H04B 7/04* (2006.01)
(Continued)

(52) U.S. Cl.
CPC .......... *H04B 7/0634* (2013.01); *H04B 7/0452* (2013.01); *H04L 5/006* (2013.01); *H04L 5/0053* (2013.01); *H04L 5/0064* (2013.01); *H04L 25/0248* (2013.01); *H04B 7/066* (2013.01); *H04L 5/0023* (2013.01); *H04L 5/0048* (2013.01); *H04L 25/03343* (2013.01);
(Continued)

(58) Field of Classification Search
CPC ............................ H04L 5/0023; H04B 7/0634

USPC ...................... 455/69, 422.1, 562.1; 370/312
See application file for complete search history.

(56) References Cited

U.S. PATENT DOCUMENTS

| 7,151,809 B2 | 12/2006 | Ketchum et al. |
| 2007/0177681 A1 | 8/2007 | Choi et al. |
| 2007/0213013 A1 | 9/2007 | Kim |
| 2007/0223619 A1 | 9/2007 | Lee et al. |
| 2008/0080635 A1 | 4/2008 | Hugl et al. |

(Continued)

FOREIGN PATENT DOCUMENTS

| CN | 1922800 A | 2/2007 |
| CN | 101340222 A | 1/2009 |

(Continued)

OTHER PUBLICATIONS

Ishihara K., et al., "CSI Report for Explicit Feedback Beamforming in Downlink MU-MIMO", IEEE 802.11-10/0332r0, Mar. 15, 2010, pp. 1-14, URL, https://mentor.ieee.org/802.11/dcn/10/11-10-0332-00-00ac-csi-report-for-explicit-feedback-beamforming-in-downlink-mu-mimo.pptx.

(Continued)

*Primary Examiner* — Hsin-Chun Liao
(74) *Attorney, Agent, or Firm* — Patterson & Sheridan, L.L.P

(57) ABSTRACT

Certain aspects of the present disclosure relate to techniques for transmitting sounding feedback in Very High Throughput (VHT) wireless systems. The sounding feedback may be transmitted from a user station (STA), wherein the feedback may comprise a certain number of beamforming matrices and a certain number of singular values of a wireless channel associated with the STA. Further, the sounding feedback may comprise a bit for indicating whether this feedback represents a Single-User (SU) feedback or a Multi-User (MU) feedback.

33 Claims, 9 Drawing Sheets

(51) Int. Cl.
*H04L 25/02* (2006.01)
*H04L 5/00* (2006.01)
*H04L 25/03* (2006.01)

(52) U.S. Cl.
CPC ........... *H04L 2025/03414* (2013.01); *H04L 2025/03426* (2013.01); *H04L 2025/03808* (2013.01)

(56) References Cited

U.S. PATENT DOCUMENTS

| | | | |
|---|---|---|---|
| 2008/0108310 | A1 | 5/2008 | Tong et al. |
| 2008/0132281 | A1 | 6/2008 | Kim et al. |
| 2008/0212666 | A1* | 9/2008 | Kuchi et al. ............... 375/231 |
| 2008/0317156 | A1 | 12/2008 | Sivanesan et al. |
| 2009/0034637 | A1 | 2/2009 | Hoshino et al. |
| 2009/0086842 | A1 | 4/2009 | Shi et al. |
| 2009/0268698 | A1 | 10/2009 | Lee et al. |
| 2010/0034146 | A1 | 2/2010 | Hou et al. |
| 2010/0103832 | A1 | 4/2010 | Zhou et al. |
| 2010/0309834 | A1 | 12/2010 | Fischer et al. |
| 2011/0096796 | A1 | 4/2011 | Zhang et al. |
| 2011/0116488 | A1 | 5/2011 | Grandhi |
| 2011/0128929 | A1 | 6/2011 | Liu et al. |
| 2011/0159866 | A1* | 6/2011 | Kim et al. ............... 455/422.1 |

FOREIGN PATENT DOCUMENTS

| | | |
|---|---|---|
| CN | 101809886 A | 8/2010 |
| JP | 2007517455 | 6/2007 |
| JP | 2009530898 A | 8/2009 |
| RU | 2007139587 A | 4/2009 |
| WO | WO-2004038952 | 5/2004 |
| WO | WO-2008024773 A2 | 2/2008 |
| WO | WO-2009023860 | 2/2009 |
| WO | WO-2009027931 A2 | 3/2009 |
| WO | 2009/045910 A2 | 4/2009 |
| WO | 2011/028943 A1 | 3/2011 |

OTHER PUBLICATIONS

Kim J., et al., "Benefits of Compressed Explicit feedback to resolve CID 2969", IEEE 802.11-07/0666r0, May 9, 2007, pp. 1-6, URL, https://mentor.ieee.org/802.11/dcn/07/11-07-0666-00-000n-proposed-resolution-cid2969-lb97.ppt.

Zhang H., et al., "802.11ac Preamble", IEEE 802.11-10/0070r1, Feb. 10, 2010, pp. 1-23, URL, https://mentor.ieee.org/802.11/dcn/10/11-10-0070-01-00ac-802-11ac-preamble.ppt.

PCT International Search Report and Written Opinion for PCT/US11/050851, dated Nov. 8, 2011.

Francisco R.D., et al., "An Optimized Unitary Beamforming Technique for MIMO Broadcast Channels," IEEE Transactions on Wireless Communications, 2010, vol. 9 (3), pp. 990-1000.

Taiwan Search Report—TW100132476—TIPO—Jun. 5, 2014.

Imashioya R., et al., "Design of Very High Throughput Wireless LAN with Backward Compatibility," Proceedings of the 2010 IEICE (Institute of Electronics, Information and Communication Engineers) General Conference, Mar. 2, 2010, p. 570.

* cited by examiner

| BW | Grouping $Ng$ | $Ns$ | Carriers for which matrices are sent |
|---|---|---|---|
| 20 MHz | 1 | 52 | All data subcarriers: -28, -27,...,-2, -1, 1,2,...27, 28 |
| | 2 | 30 | -28,-26,-24,-22,-20,-18,-16,-14,-12,-10,-8,-6,-4,-2,-1, 1,3,5,6,9,11,13,15,17,19,20,23,25,27,28 |
| | 4 | 16 | -28,-24,-20,-16,-12,-8,-4,-1,1,5,9,13,17,20,25,28 |
| 40 MHz | 1 | 108 | All data carriers: -58,-57,..., -3,-2,2,3,...,57,58 |
| | 2 | 58 | -58,-56,-54,-52,-50,-48,-46,-44,-42,-40,-38,-36,-34,-32,-30, -28,-26,-24,-22,-20,-18,-16,-14,-12,-10,-8,-6,-4,-2, 2,4,6,8,10,12,14,16,18,20,22,24,26,28, 30,32,34,36,38,40,42,44,46,48,50,52,54,56,58 |
| | 4 | 30 | -58,-54,-50,-46,-42,-38,-34,-30,-26,-22,-18,-14,-10,-6,-2, 2,6,10,14,18,22,26,30,34,38,42,46,50,54,58 |

FIG. 4

| BW | Grouping $Ng$ | $Ns$ | Carriers for which matrices are sent |
|---|---|---|---|
| 80/160 MHz | 1 | 234 | All data subcarriers: -122, -121, ... -2, 2, 3, ...,121,122 (excluding pilot tones at -103, -75,-39, -11,11,39,75,103) |
| | 2 | 122 | -122, -120, ..., -2,2,4,...,120,122 |
| | 4 | 62 | -122,-118,...,-6, -2,2,6,...,118,122 |

FIG. 5

| BW | Grouping $Ng$ | $Ns$ | Carriers for which matrices are sent |
|---|---|---|---|
| 20 MHz | 2 | 32 | -28,-27,-26,-24,…,-4,-2,-1, 1,2,4,…,24,26,27,28<br><br>Alternatively, use Ns = 36 with 5 band edge subcarriers:<br><br>-28,-27,-26,-25,-24,-22,…, -6,-4,-3,-2,-1, 1,2,3,4,6,…,22,24,25,26,27,28 |
| | 4 | 20 | -28,-27,-26,-22,-18,-14, -10,-6,-2.-1, 1,2,6,10,14,18,22,26,27,28<br><br>Alternatively, use Ns = 26 with 5 band edge subcarriers:<br><br>-28,-27,-26,-25,-24,-20, -16,-12,-8,-4,-3,-2,-1, 1,2,3,4,8,12,16,20,24,25, 26,27,28 |

FIG. 6

| BW | Grouping $N_g$ | $N_s$ | Carriers for which matrices are sent |
|---|---|---|---|
| 40 MHz | 2 | 62 | -58,-57,-56,-54,...,-6,-4,-3, -2, 2,3,4,6,...,54,56,57,58<br><br>Alternatively, use Ns = 66 with 5 band edge subcarriers:<br><br>-58,-57,-56,-55,-54,-52,..., -8,-6,-5,-4,-3,-2, 2,3,4,5,6,8,...,52,54,55,56,57,58 |
| | 4 | 36 | -58,-57,-56,-52,...,-8,-4,-3, -2,2,3,4,8,...,52,56,57,58<br><br>Alternatively, use Ns = 40 with 5 band edge subcarriers:<br><br>-58,-57,-56,-54,-50,..., -10,-6,-5,-4,-3,-2, 2,3,4,6,10,...,50,54,55,56,57,58 |

FIG. 7

| BW | Grouping $Ng$ | $Ns$ | Carriers for which matrices are sent |
|---|---|---|---|
| 80/160 MHz | 2 | 126 | -122,-121,-120,-118, …,-6,-4,-3 -2,2,3,4,6,…,118,120,121,122<br><br>Alternatively, use Ns = 130 with 5 band edge subcarriers:<br><br>-122,-121,-120,-119,-118, -116,…,-8,-6,-5,-4,-3,-2, 2,3,4,5,6,8,…,116,118,119,120, 121,122 |
| | 4 | 68 | -122,-121,-120,-116, …,-4,-3-2, 2,3,4,8,…, 116,120,121,122<br><br>Alternatively, use Ns = 74 with 5 band edge subcarriers:<br><br>-122,-121,-120,-119,-118,-114,…, -10,-6,-5,-4,-3,-2, 2,3,4,5,6,10,…,114,118,119,120, 121,122 |

FIG. 8

SOUNDING FEEDBACK SCHEMES FOR VERY HIGH THROUGHPUT WIRELESS SYSTEMS

CLAIM OF PRIORITY UNDER 35 U.S.C. §119

The present Application for Patent claims benefit of U.S. Provisional Patent Application Ser. No. 61/380,812, entitled, "SOUNDING FEEDBACK SCHEMES FOR VERY HIGH THROUGHPUT WIRELESS SYSTEMS", filed Sep. 8, 2010, and assigned to the assignee hereof and hereby expressly incorporated by reference herein.

BACKGROUND

1. Field

Certain aspects of the present disclosure generally relate to wireless communications and, more particularly, to a method for transmitting sounding feedback in Very High Throughput (VHT) wireless systems.

2. Background

In order to address the issue of increasing bandwidth requirements that are demanded for wireless communication systems, different schemes are being developed to allow multiple user terminals to communicate with a single access point (AP) by sharing the channel resources while achieving high data throughputs. Multiple Input Multiple Output (MIMO) technology represents one such approach that has recently emerged as a popular technique for the next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single AP and multiple user stations (STAs), concurrent transmissions may occur on multiple channels toward different STAs, both in uplink and downlink directions. Many challenges are present in such systems. For example, the AP may transmit signals using different standards such as the IEEE 802.11n/a/b/g or the IEEE 802.11ac standards. A receiver STA may be able to detect a transmission mode of the signal based on information included in a preamble of the transmission packet.

A downlink multi-user MIMO (MU-MIMO) system based on Spatial Division Multiple Access (SDMA) transmission can simultaneously serve a plurality of spatially separated STAs by applying beamforming at the AP's antenna array. Complex transmit precoding weights can be calculated by the AP based on channel state information (CSI) received from each of the supported STAs.

Since a channel between the AP and a STA of the plurality STAs may vary with time due to a mobility of that STA or due to mode stirring caused by objects moving in the STA's environment, the CSI may need to be updated periodically in order for the AP to accurately beamform to that particular STA. A required rate of CSI feedback for each STA may depend on a coherence time of a channel between the AP and that STA. An insufficient feedback rate may adversely impact performance due to inaccurate beamforming. On the other hand, an excessive feedback rate may produce minimal additional benefit, while wasting valuable medium time.

In a scenario consisting of multiple spatially separated users, it can be expected that the channel coherence time, and therefore the appropriate CSI feedback rate, vary spatially across the users. In addition, due to various factors, such as changing channel conditions and mobility of a user, the appropriate CSI feedback rate may also vary temporally for each of the users. For example, some STAs (such as a high definition television (HDTV) or a set-top box) may be stationary, whereas others (such as handheld devices) may be subject to motion. Furthermore, a subset of STAs may be subject to a high Doppler from fluorescent light effects. Finally, multi-paths to some STAs may have more Doppler than others since different scatterers may move at different velocities and affect different subsets of STAs.

Therefore, if a single rate of CSI feedback is utilized for all supported STAs in a wireless system, the system performance may suffer due to inaccurate beamforming for those STAs with insufficient feedback rates, and/or due to excessive feedback overhead for those STAs with unnecessarily high feedback rates.

In conventional schemes, the CSI feedback occurs at a rate consistent with the worst-case user in terms of mobility or temporal channel variation. For an SDMA system consisting of STAs experiencing a range of channel conditions, no single CSI feedback rate is appropriate for all STAs. Catering to the worst-case user will result in an unnecessary waste of channel resources by forcing STAs in relatively static channel conditions to feedback CSI at the same rate as those in a highly dynamic channel.

For example, in the case of Evolution-Data Optimized (EV-DO) data rate control channel (DRC), the "channel state" information reflects a received pilot signal-to-interference-plus-noise ratio (SINR) and is transmitted by a STA to facilitate rate selection for the next transmission. This information is updated at a fixed rate for all users, presumably at a rate sufficient to track channel variations associated with the worst-case expected mobility situations. This rate of channel state feedback may be unnecessarily high for static users. In this case, however, the DRC was designed to provide minimal overhead. Because the CSI in SDMA system is used to support complex beamforming at the AP, it may not be feasible to compress or streamline this feedback to the degree accomplished in the EV-DO design.

As another example, for the Institute of Electrical and Electronic Engineers (IEEE) 802.11n standard supporting transmit beamforming, the rate at which CSI is transmitted is not specified, and this is considered an implementation issue. In contrast, due to the potentially high overhead of CSI feedback for multiple SDMA users in the IEEE 802.11ac (Very High Throughput (VHT)) standard, and due to potential abuse of such CSI feedback mechanism by rogue STAs, it may be desirable to specify protocols for CSI feedback in the standard specification.

SUMMARY

Certain aspects of the present disclosure provide a method for wireless communications. The method generally includes generating, at an apparatus, a unified structure for a sounding feedback for single user (SU) and multi user (MU) communications, wherein the sounding feedback comprises at least one of one or more beamforming matrices or one or more singular values of a channel associated with the apparatus, and transmitting the sounding feedback over the channel.

Certain aspects of the present disclosure provide an apparatus for wireless communications. The apparatus generally includes means for generating a unified structure for a sounding feedback for single user (SU) and multi user (MU) communications, wherein the sounding feedback comprises at least one of one or more beamforming matrices or one or more singular values of a channel associated with the apparatus, and means for transmitting the sounding feedback over the channel.

Certain aspects of the present disclosure provide an apparatus for wireless communications. The apparatus generally includes a circuit configured to generate a unified structure for a sounding feedback for single user (SU) and multi user (MU) communications, wherein the sounding feedback comprises at least one of one or more beamforming matrices or one or more singular values of a channel associated with the apparatus, and a transmitter configured to transmit the sounding feedback over the channel.

Certain aspects of the present disclosure provide a computer readable medium containing executable instructions for wireless communications. The executable instructions generally include instructions for generating, at an apparatus, a unified structure for a sounding feedback for single user (SU) and multi user (MU) communications, wherein the sounding feedback comprises at least one of one or more beamforming matrices or one or more singular values of a channel associated with the apparatus, and transmitting the sounding feedback over the channel.

Certain aspects provide an access terminal. The access terminal generally includes at least one antenna, a circuit configured to generate a unified structure for a sounding feedback for single user (SU) and multi user (MU) communications, wherein the sounding feedback comprises at least one of one or more beamforming matrices or one or more singular values of a channel associated with the access terminal, and a transmitter configured to transmit via the at least one antenna the sounding feedback over the channel.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 4 illustrates example carriers for which a sounding feedback is transmitted for channel bandwidths of 20 MHz and 40 MHz in accordance with certain aspects of the present disclosure.

FIG. 5 illustrates example carriers for which a sounding feedback is transmitted for a channel bandwidth of 80/160 MHz in accordance with certain aspects of the present disclosure.

FIG. 6 illustrates other example carriers for which a sounding feedback is transmitted for a channel bandwidth of 20 MHz in accordance with certain aspects of the present disclosure.

FIG. 7 illustrates example carriers for which a sounding feedback is transmitted for a channel bandwidth of 40 MHz in accordance with certain aspects of the present disclosure.

FIG. 8 illustrates example carriers for which a sounding feedback is transmitted for a channel bandwidth of 80/160 MHz in accordance with certain aspects of the present disclosure.

DETAILED DESCRIPTION

Figure 1:
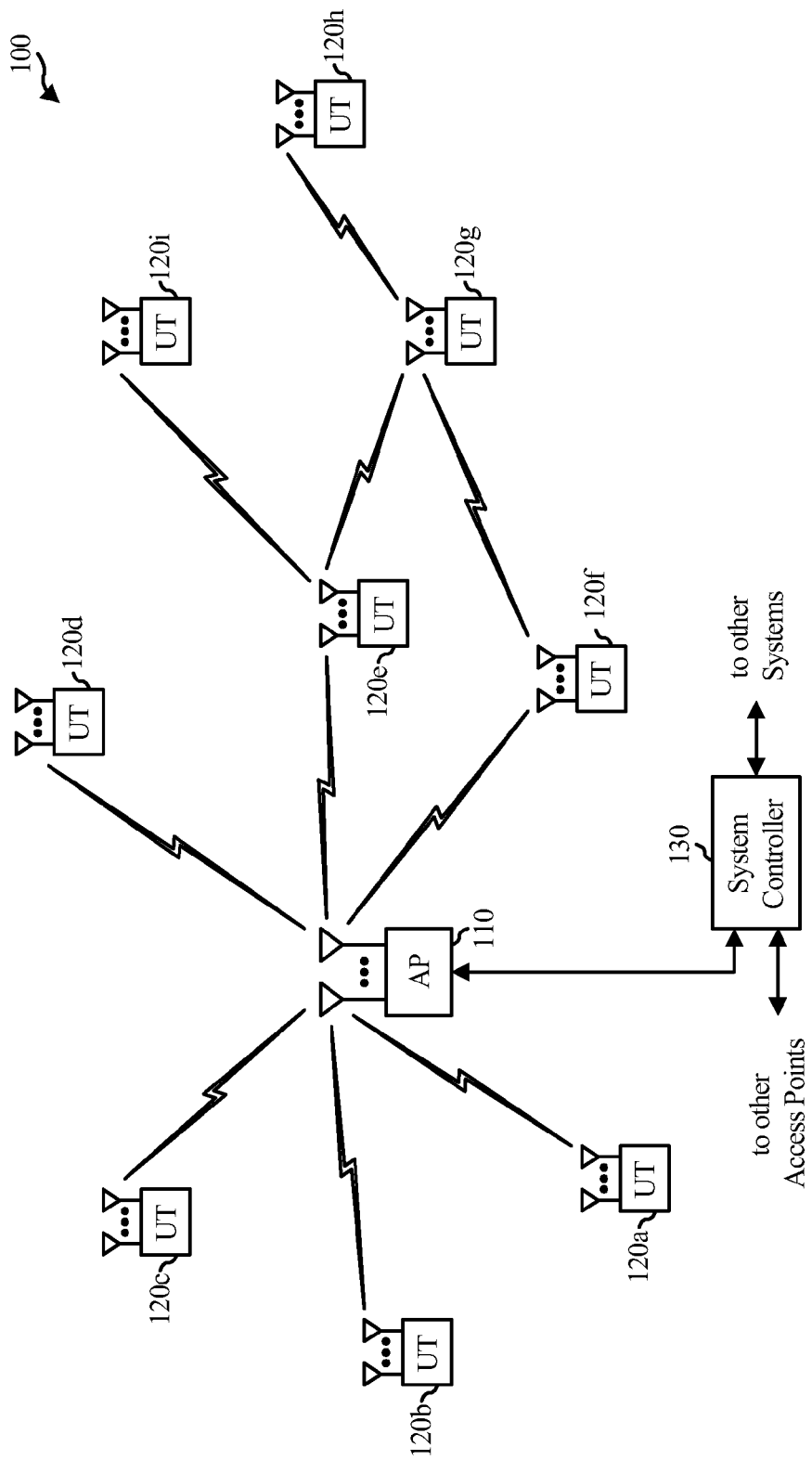
FIG. 1 illustrates a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on a single carrier transmission. Aspects disclosed herein may be, for example, advantageous to systems employing Ultra Wide Band (UWB) signals including millimeter-wave signals. However, the present disclosure is not intended to be limited to such systems, as other coded signals may benefit from similar advantages.

The teachings herein may be incorporated into (e.g., implemented within or performed by) a variety of wired or wireless apparatuses (e.g., nodes). In some aspects a node comprises a wireless node. Such wireless node may provide, for example, connectivity for or to a network (e.g., a wide area network such as the Internet or a cellular network) via a wired or wireless communication link. In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. In some implementations an access point may comprise a set top box kiosk, a media center, or any other suitable device that is configured to communicate via a wireless or wired medium.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), a tablet, an entertainment device (e.g., a music or video device, or a satellite radio), a television display, a flip-cam, a security video camera, a digital video recorder (DVR), a global positioning system device, or any other suitable device that is configured to communicate via a wireless or wired medium.

FIG. 1 illustrates a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In certain cases, it may be desirable to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). MIMO system 100 may represent a high speed Wireless Local Area Network (WLAN) operating in a 60 GHz band.

Figure 2:
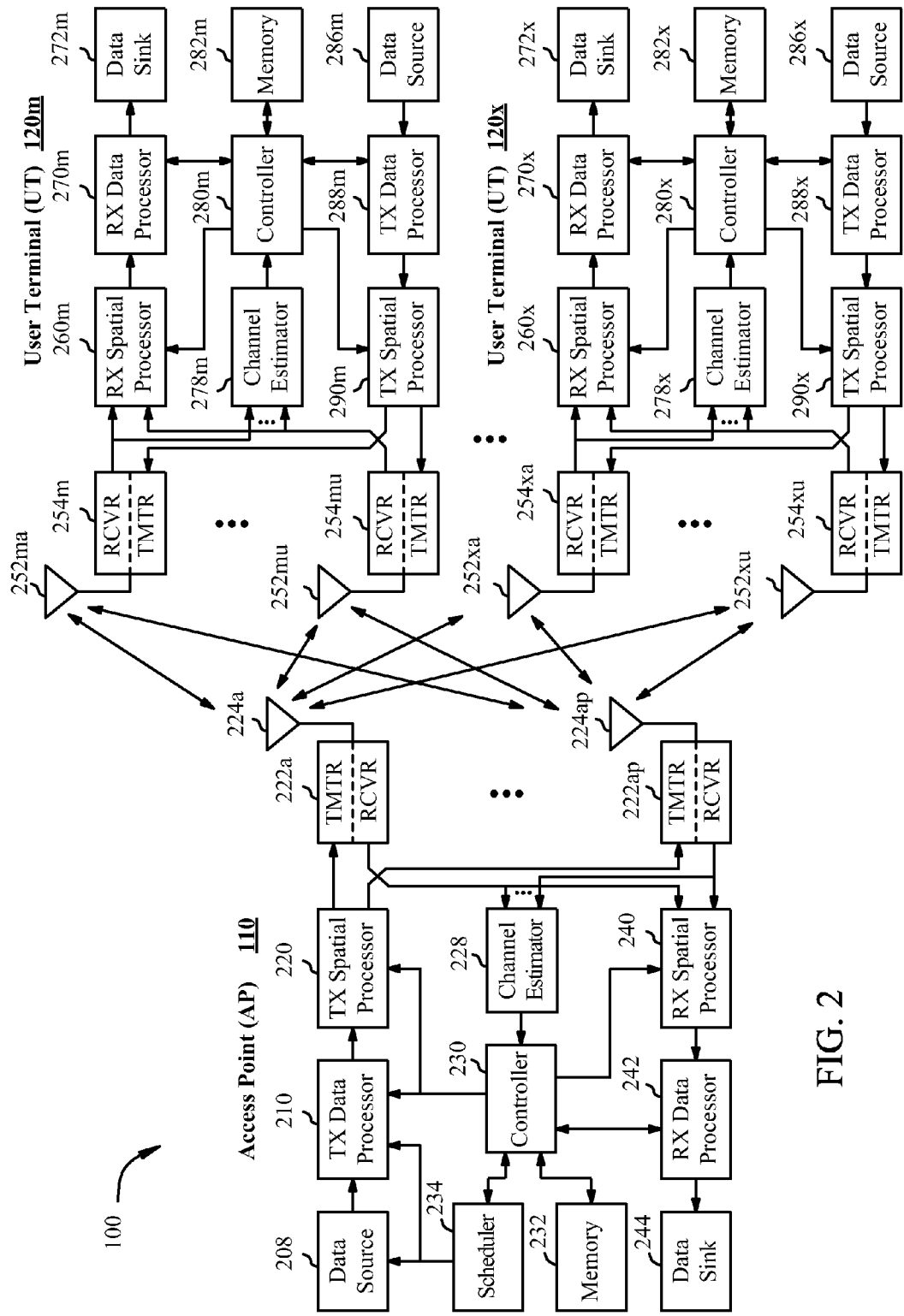
FIG. 2 illustrates a block diagram of an example access point and user terminals in accordance with certain aspects of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{s_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{s_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

According to certain aspects of the present disclosure, a unified sounding feedback mechanism for IEEE 802.11ac (Very High Throughput (VHT)) wireless communications standard can be supported. This mechanism may work efficiently for both single user (SU) and multi-user (MU) feedback. A mechanism being proposed in the present disclosure may result in a single receiver state machine, a single sounding frame exchange, a single Null Data Packet (NDP) transmission from an access point (e.g., the access point 110) requesting the sounding feedback (e.g., from user terminal(s) 120), and a unified feedback structure.

Figure 3:
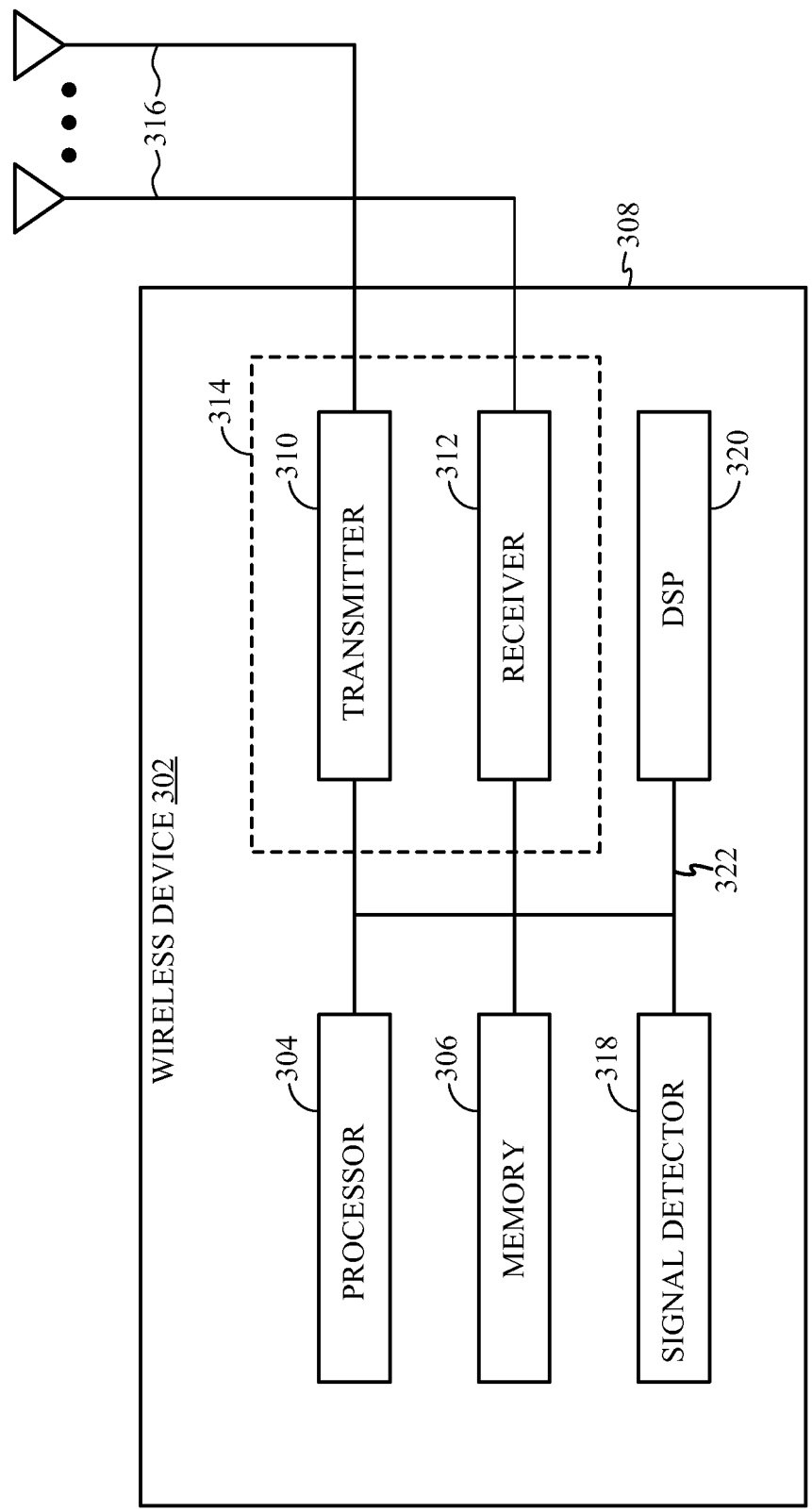
FIG. 3 illustrates a block diagram of an example wireless device in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Certain aspects of the present disclosure support a unified sounding feedback mechanism for VHT wireless communications systems, which may work efficiently for both SU and MU feedback. The present disclosure proposes a mechanism that may result in a single receiver state machine, a single sounding frame exchange, a single NDP transmission from an access point (e.g., from the wireless device 302)

requesting the sounding feedback (i.e., from a user terminal, such as the wireless device 302), and a unified feedback structure.

Transmission of Sounding Feedback for VHT Systems

Certain aspects of the present disclosure support transmitting a sounding feedback from a user station (STA) in a wireless Local Area Network (LAN) system, wherein the feedback may comprise a certain number of beamforming matrices and a certain number of singular values of a wireless channel associated with the STA. Further, the sounding feedback may comprise a bit for indicating whether this feedback corresponds to a SU feedback or a MU feedback.

The beamforming matrices being fed back may comprise one or more columns of V matrix (i.e., eigenvector matrix), wherein the V matrix may be based on singular value decomposition (SVD) of a matrix representing the wireless channel. In one aspect of the present disclosure, the matrix V may comprise a matrix of right eigen-vectors of the wireless channel. In an aspect, the beamforming matrices may be sampled every $N_g$ tones ($N_g \geq 1$) and possibly including tones close to guard band and DC tones, while some selected tones such as pilot tones may be excluded. Different tone numbers may be considered for different channel bandwidths, such as channel bandwidths of 20 MHz, 40 MHz, 80 MHz, and 160 MHz.

In one aspect of the present disclosure, the parameter $N_g$ may be selected according to the frequency selectivity of the channel. The beamforming matrices sampled every $N_g$ tones ($N_g \geq 1$) may be smoothed across frequency before transmitting the feedback.

The singular values (eigen-values) being transmitted within the sounding feedback may comprise a subset of diagonal entries of a matrix of eigenvalues of the wireless channel. These singular values may be sampled every $N_v$ tones, where $N_v \geq N_g$. In one aspect of the present disclosure, the parameter $N_v$ may be selected according to the frequency selectivity of the channel.

For certain aspects of the present disclosure, the beamforming matrices of the sounding feedback may be transmitted in a compressed manner using Given's rotations angles ψ and φ (nomenclature of angles is the same one being used in IEEE 802.11n specification). A bit-width of the angles may change depending upon the sounding feedback being an MU feedback or an SU feedback. In one aspect of the present disclosure, in the case of MU-MIMO feedback, 5 bits of resolution may be used for the angle ψ and 7 bits for the angle φ. In another aspect, in the case of MU-MIMO feedback, 6 bits of resolution may be used for the angle ψ r and 8 bits for the angle φ. In yet another aspect, in the case of MU-MIMO feedback, 7 bits of resolution may be used for the angle ψ and 9 bits for the angle φ.

A STA capable of receiving MU-MIMO downlink transmissions may be required to include within the sounding feedback the singular values and additional information such as a minimum rank for the feedback of matrix V, per tone signal-to-noise ratio (SNR), and so on. On the other hand, a STA not being capable of receiving the MU-MIMO downlink transmissions may be able to fill-in NULL into some of these additional fields of the sounding feedback (e.g., the fields associated with the singular values, with the rank of matrix V, with the information about per tone SNR, etc).

For certain aspects of the present disclosure, tones on which the matrix V is transmitted as a part of the sounding feedback may comprise tone indices for channel bandwidths of 20 MHz, 40 Hz and 80/160 MHz as given in FIGS. 4-8.

The parameter $N_s$ in FIGS. 4-8 denotes a number of tones on which the sounding feedback may be transmitted.

In one aspect of the present disclosure, the beamforming matrices transmitted within the sounding feedback may comprise one or more columns of the V matrix, may be sampled every $N_g$ tones ($N_g \geq 1$). Additionally, the beamforming matrices may comprise the one or more columns of V matrix on at least one of a few tones around band edge or a few tones around DC. This is illustrated in FIGS. 6-8.

Figure 9:
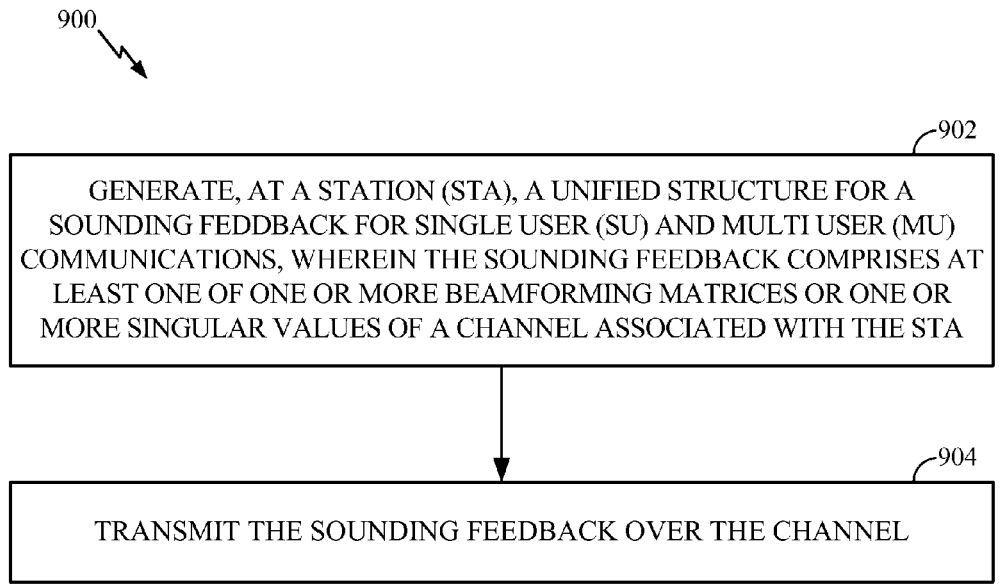
FIG. 9 illustrates example operations for transmitting sounding feedback from a user station (STA) in accordance with certain aspects of the present disclosure.

FIG. 9 illustrates example operations 900 for transmitting a sounding feedback from a user station (STA) (e.g., an access terminal) in accordance with certain aspects of the present disclosure. At 902, the STA may generate a unified structure for a sounding feedback for single user (SU) and multi user (MU) communications, wherein the sounding feedback may comprise at least one of one or more beamforming matrices or one or more singular values of a channel associated with the STA. At 904, the STA may transmit the sounding feedback over the channel. The one or more beamforming matrices may be utilized at an access point that receives the sounding feedback for beamforming of downlink transmissions. In an aspect of the present disclosure, the one or more singular values may be conveyed through a signal-to-noise ratio (SNR) per space-time stream.

Figure 9A:
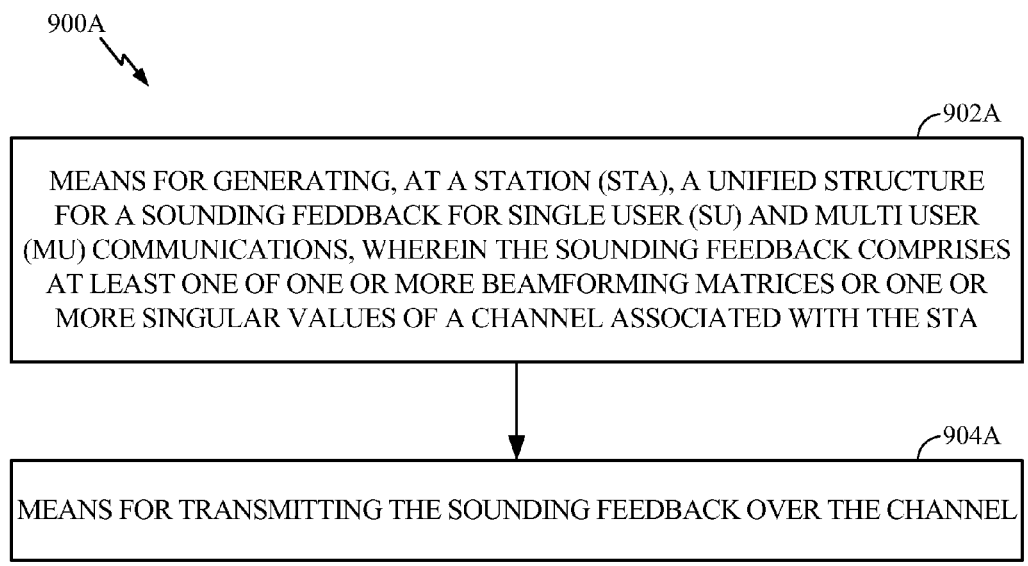
FIG. 9A illustrates example components capable of performing the operations of FIG. 9.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 900 illustrated in FIG. 9 correspond to components 900A illustrated in FIG. 9A.

For example, the means for generating may comprise an application specific integrated circuit, e.g., the TX data processor 288 from FIG. 2 of the user terminal 120, or the processor 304 from FIG. 3 of the wireless device 302. The means for transmitting may comprise a transmitter, e.g., the transmitter 254 from FIG. 2 of the user terminal 120, or the transmitter 310 from FIG. 3 of the wireless device 302. The means for including may comprise an application specific integrated circuit, e.g., the TX data processor 288, or the processor 304. The means for filling may comprise an application specific integrated circuit, e.g., the TX data processor 288, or the processor 304. The means for smoothing may comprise an application specific integrated circuit, e.g., the TX data processor 288, or the processor 304.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
receiving, at an apparatus, a request for sounding feedback; and
transmitting the sounding feedback in a unified structure for sending sounding feedback for single user (SU) and multi user (MU) communications, wherein the sounding feedback comprises at least one of one or more beamforming matrices or one or more singular values of a channel associated with the apparatus, wherein the one or more beamforming matrices are transmitted within the sounding feedback in a compressed manner using Given's rotations angles, and wherein the sounding feedback transmitted in the compressed manner comprises one of:
five bits for representing a first of the Given's rotations angles and seven bits for representing a second of the Given's rotations angles,
six bits for representing the first angle and eight bits for representing the second angle, or
seven bits for representing the first angle and nine bits for representing the second angle.

2. The method of claim 1, wherein the unified structure comprises an indication whether the sounding feedback is associated with the SU communication or with the MU communication.

3. The method of claim 1, wherein the one or more singular values are conveyed through a signal-to-noise ratio (SNR) per space-time stream.

4. The method of claim 1, wherein:
each of the one or more beamforming matrices comprises one or more columns of an eigenvector matrix associated with a singular value decomposition (SVD) of a matrix representing the channel,
each of the one or more beamforming matrices is sampled for communication every $N_g$ tones, $N_g \geq 1$, and
the sounding feedback is transmitted on subcarriers associated with the tones for which the one or more beamforming matrices are sampled.

5. The method of claim 4, wherein:
the tones for which the one or more beamforming matrices are sampled comprise at least one of tones close to a guard band or DC tones, and
the tones for which the one or more beamforming matrices are sampled do not comprise pilot tones.

6. The method of claim 4, wherein the subcarriers are associated with a bandwidth of the channel of 20 MHz, 40 MHz, 80 MHz, or 160 MHz.

7. The method of claim 4, wherein the parameter $N_g$ is selected according to a frequency selectivity of the channel.

8. The method of claim 4, further comprising:
including, in the unified structure, at least one of information about a rank of the eigenvector matrix or information about a signal-to-noise ratio (SNR) associated with each column of the one or more beamforming matrices for every subcarrier at which the eigenvector matrix is sampled,
if the apparatus is capable of receiving multi-user multiple-input multiple-output (MU-MIMO) downlink transmission.

9. The method of claim 4, further comprising:
filling null information into one or more fields of the unified structure, the fields being related to at least one of a rank of the eigenvector matrix or a signal-to-noise ratio (SNR) associated with each column of the one or more beamforming matrices for every subcarrier at which the eigenvector matrix is sampled,
if the apparatus is not capable of receiving multi-user multiple-input multiple-output (MU-MIMO) downlink transmission.

10. The method of claim 4, wherein each of the one or more beamforming matrices further comprises at least one column of the eigenvector matrix on at least one of tones around a band edge or tones around a DC tone.

11. The method of claim 1, further comprising:
smoothing the one or more beamforming matrices across frequency before transmitting the sounding feedback.

12. The method of claim 1, wherein:
the one or more singular values comprise a subset of diagonal entries of a matrix of eigen-values associated with a matrix representing the channel,
the one or more singular values are conveyed through a signal-to-noise ratio (SNR) per space-time stream,
each of the one or more beamforming matrices is sampled for communication every $N_g$ tones, $N_g \geq 1$, and
each of the one or more singular values is sampled for communication every $N_v$ tones, $N_v \geq N_g$.

13. The method of claim 12, wherein the parameter $N_v$ is selected according to a frequency selectivity of the channel.

14. The method of claim 1, wherein a number of bits used for representing the Given's rotations angles depends on whether the sounding feedback is associated with the SU communication or with the MU communication.

15. The method of claim 1, wherein the sounding feedback is transmitted in accordance with IEEE 802.11 family of wireless communications standards.

16. An apparatus for wireless communications, comprising:
means for receiving a request for sounding feedback; and
means for transmitting the sounding feedback in a unified structure for sending sounding feedback for single user (SU) and multi user (MU) communications, wherein the sounding feedback comprises at least one of one or more beamforming matrices or one or more singular values of a channel associated with the apparatus, wherein the one or more beamforming matrices are transmitted within the sounding feedback in a compressed manner using Given's rotations angles, and wherein the sounding feedback transmitted in the compressed manner comprises one of:
five bits for representing a first of the Given's rotations angles and seven bits for representing a second of the Given's rotations angles,
six bits for representing the first angle and eight bits for representing the second angle, or
seven bits for representing the first angle and nine bits for representing the second angle.

17. The apparatus of claim 16, wherein the unified structure comprises an indication whether the sounding feedback is associated with the SU communication or with the MU communication.

18. The apparatus of claim 16, wherein the one or more singular values are conveyed through a signal-to-noise ratio (SNR) per space-time stream.

19. The apparatus of claim 16, wherein:
each of the one or more beamforming matrices comprises one or more columns of an eigenvector matrix associated with a singular value decomposition (SVD) of a matrix representing the channel,
each of the one or more beamforming matrices is sampled for communication every $N_g$ tones, $N_g \geq 1$, and
the sounding feedback is transmitted on subcarriers associated with the tones for which the one or more beamforming matrices are sampled.

20. The apparatus of claim 19, wherein:
the tones for which the one or more beamforming matrices are sampled comprise at least one of tones close to a guard band or DC tones, and
the tones for which the one or more beamforming matrices are sampled do not comprise pilot tones.

21. The apparatus of claim 19, wherein the subcarriers are associated with a bandwidth of the channel of 20 MHz, 40 MHz, 80 MHz, or 160 MHz.

22. The apparatus of claim 19, wherein the parameter $N_g$ is selected according to a frequency selectivity of the channel.

23. The apparatus of claim 19, further comprising:
means for including, in the unified structure, at least one of information about a rank of the eigenvector matrix or information about a signal-to-noise ratio (SNR) associated with each column of the one or more beamforming matrices for every subcarrier at which the eigenvector matrix is sampled,
if the apparatus is capable of receiving multi-user multiple-input multiple-output (MU-MIMO) downlink transmission.

24. The apparatus of claim 19, further comprising:
means for filling null information into one or more fields of the unified structure, the fields being related to at least one of a rank of the eigenvector matrix or a signal-to-noise ratio (SNR) associated with each column of the one or more beamforming matrices for every subcarrier at which the eigenvector matrix is sampled,
if the apparatus is not capable of receiving multi-user multiple-input multiple-output (MU-MIMO) downlink transmission.

25. The apparatus of claim 19, wherein each of the one or more beamforming matrices further comprises at least one column of the eigenvector matrix on at least one of tones around a band edge or tones around a DC tone.

26. The apparatus of claim 16, further comprising:
means for smoothing the one or more beamforming matrices across frequency before transmitting the sounding feedback.

27. The apparatus of claim 16, wherein:
the one or more singular values comprise a subset of diagonal entries of a matrix of eigen-values associated with a matrix representing the channel,
the one or more singular values are conveyed through a signal-to-noise ratio (SNR) per space-time stream,
each of the one or more beamforming matrices is sampled for communication every $N_g$ tones, $N_g \geq 1$, and
each of the one or more singular values is sampled for communication every $N_v$ tones, $N_v \geq N_g$.

28. The apparatus of claim 27, wherein the parameter $N_v$ is selected according to a frequency selectivity of the channel.

29. The apparatus of claim 16, wherein a number of bits used for representing the Given's rotations angles depends on whether the sounding feedback is associated with the SU communication or with the MU communication.

30. The apparatus of claim 16, wherein the sounding feedback is transmitted in accordance with IEEE 802.11 family of wireless communications standards.

31. An apparatus for wireless communications, comprising:
a receiver configured to receive a request for sounding feedback; and
transmitter configured to transmit the sounding feedback in a unified structure for sending sounding feedback for single user (SU) and multi user (MU) communications, wherein the sounding feedback comprises at least one of one or more beamforming matrices or one or more singular values of a channel associated with the apparatus, wherein the one or more beamforming matrices are transmitted within the sounding feedback in a compressed manner using Given's rotations angles, and wherein the sounding feedback transmitted in the compressed manner comprises one of:

five bits for representing a first of the Given's rotations angles and seven bits for representing a second of the Given's rotations angles, six bits for representing the first angle and eight bits for representing the second angle, or seven bits for representing the first angle and nine bits for representing the second angle.

32. A non-transitory computer readable medium containing executable instructions for wireless communications, the executable instructions comprising instructions for:

receiving, at an apparatus, a request for sounding feedback; and transmitting the sounding feedback in a unified structure for sending sounding feedback for single user (SU) and multi user (MU) communications, wherein the sounding feedback comprises at least one of one or more beamforming matrices or one or more singular values of a channel associated with the apparatus, wherein the one or more beamforming matrices are transmitted within the sounding feedback in a compressed manner using Given's rotations angles, and wherein the sounding feedback transmitted in the compressed manner comprises one of:

five bits for representing a first of the Given's rotations angles and seven bits for representing a second of the Given's rotations angles, six bits for representing the first angle and eight bits for representing the second angle, or seven bits for representing the first angle and nine bits for representing the second angle.

33. An access terminal, comprising:

one antenna;

a receiver configured to receive, via the at least one antenna, a request for sounding feedback; and a transmitter configured to transmit, via the at least one antenna, the sounding feedback in a unified structure for sending sounding feedback for single user (SU) and multi user (MU) communications, wherein the sounding feedback comprises at least one of one or more beamforming matrices or one or more singular values of a channel associated with the access terminal, wherein the one or more beamforming matrices are transmitted within the sounding feedback in a compressed manner using Given's rotations angles, and wherein the sounding feedback transmitted in the compressed manner comprises one of:

five bits for representing a first of the Given's rotations angles and seven bits for representing a second of the Given's rotations angles, six bits for representing the first angle and eight bits for representing the second angle, or seven bits for representing the first angle and nine bits for representing the second angle.

* * * * *